US010922117B2

(12) United States Patent
Shi et al.

(10) Patent No.: US 10,922,117 B2
(45) Date of Patent: Feb. 16, 2021

(54) VTPM-BASED VIRTUAL MACHINE SECURITY PROTECTION METHOD AND SYSTEM

(71) Applicant: HUAWEI TECHNOLOGIES CO., LTD., Guangdong (CN)

(72) Inventors: Xun Shi, Shenzhen (CN); Juan Wang, Wuhan (CN); Bo Zhao, Hubei (CN)

(73) Assignee: Huawei Technologies Co., Ltd., Shenzhen (CN)

(*) Notice: Subject to any disclaimer, the term of this patent is extended or adjusted under 35 U.S.C. 154(b) by 304 days.

(21) Appl. No.: 15/892,594

(22) Filed: Feb. 9, 2018

(65) Prior Publication Data

US 2018/0181426 A1    Jun. 28, 2018

Related U.S. Application Data

(63) Continuation of application No. PCT/CN2016/097818, filed on Sep. 1, 2016.

(30) Foreign Application Priority Data

Jan. 27, 2016    (CN) .......................... 201610057356.8

(51) Int. Cl.
*G06F 9/455*        (2018.01)
*G06F 21/53*        (2013.01)
(Continued)

(52) U.S. Cl.
CPC .......... *G06F 9/45558* (2013.01); *G06F 21/53* (2013.01); *G06F 21/57* (2013.01);
(Continued)

(58) Field of Classification Search
CPC ...... G06F 9/45558; G06F 21/57; G06F 21/53; G06F 2009/45587; H04L 63/045; H04L 9/0869
(Continued)

(56) References Cited

U.S. PATENT DOCUMENTS 8,498,417 B1 *    7/2013    Harwood ............ H04L 67/1097
                                                    380/277
9,686,077 B2 *    6/2017    Raj ...................... H04L 63/0428
(Continued)

FOREIGN PATENT DOCUMENTS

CN    101977183 A    2/2011
CN    103020543 A    4/2013
(Continued)

OTHER PUBLICATIONS

International Search Report and Written Opinion in International Application No. PCT/CN2016/097818, dated Dec. 7, 2016, 10 pages.
(Continued)

*Primary Examiner* — Tae K Kim
*Assistant Examiner* — Peiliang Pan
(74) *Attorney, Agent, or Firm* — Fish & Richardson P.C.

(57) ABSTRACT

The present application discloses a virtual trusted platform module (vTPM)-based virtual machine security protection method and system. The method, executed by a physical host, includes: receiving a primary seed acquisition request sent by a virtual machine, where the primary seed acquisition request carries a UUID; sending the UUID to a KMC, so that the KMC generates a primary seed according to the UUID; and receiving the primary seed fed back by the KMC, and sending the primary seed to the virtual machine, so that the virtual machine creates a root key of a vTPM according to the primary seed, where the root key is used by the vTPM to create a key for the virtual machine to protect security of the virtual machine. As such, the same root key can be created by using the primary seed.

18 Claims, 6 Drawing Sheets

(51) Int. Cl.
  *H04L 12/24* (2006.01)
  *H04L 29/08* (2006.01)
  *G06F 21/57* (2013.01)
  *H04L 9/08* (2006.01)
  *H04L 9/14* (2006.01)
  *H04L 9/30* (2006.01)
  *H04L 29/06* (2006.01)

(52) U.S. Cl.
  CPC ............ *H04L 9/0869* (2013.01); *H04L 9/14* (2013.01); *H04L 9/30* (2013.01); *H04L 41/0893* (2013.01); *H04L 41/5054* (2013.01); *H04L 63/045* (2013.01); *H04L 67/10* (2013.01); *H04L 67/1008* (2013.01); *H04L 67/34* (2013.01); *G06F 2009/4557* (2013.01); *G06F 2009/45587* (2013.01); *G06F 2221/034* (2013.01)

(58) Field of Classification Search
  USPC .......................................................... 713/197
  See application file for complete search history.

(56) References Cited

U.S. PATENT DOCUMENTS

| | | | |
|---|---|---|---|
| 10,409,837 B1 * | 9/2019 | Schmidt | G06F 16/27 |
| 2006/0072747 A1 | 4/2006 | Wood et al. | |
| 2008/0046581 A1 * | 2/2008 | Molina | H04L 63/08 |
| | | | 709/229 |
| 2008/0209221 A1 * | 8/2008 | Vennelakanti | H04L 9/3273 |
| | | | 713/183 |
| 2008/0244569 A1 | 10/2008 | Challener et al. | |
| 2009/0063488 A1 * | 3/2009 | Daum | G06Q 10/00 |
| 2009/0086979 A1 * | 4/2009 | Brutch | H04L 9/0836 |
| | | | 380/279 |
| 2009/0169012 A1 * | 7/2009 | Smith | G06F 21/57 |
| | | | 380/277 |
| 2010/0082991 A1 * | 4/2010 | Baldwin | H04L 9/083 |
| | | | 713/176 |
| 2010/0127083 A1 * | 5/2010 | Brown | G07F 7/08 |
| | | | 235/492 |
| 2011/0246785 A1 * | 10/2011 | Linsley | G06F 21/53 |
| | | | 713/189 |
| 2012/0101956 A1 * | 4/2012 | Hyre | G06Q 10/087 |
| | | | 705/330 |
| 2012/0110574 A1 * | 5/2012 | Kumar | G06F 9/45558 |
| | | | 718/1 |
| 2013/0031051 A1 * | 1/2013 | Mujumdar | G06F 16/273 |
| | | | 707/626 |
| 2014/0208123 A1 * | 7/2014 | Roth | G06F 21/53 |
| | | | 713/189 |
| 2015/0178504 A1 * | 6/2015 | Nystrom | G06F 9/45533 |
| | | | 713/2 |
| 2015/0222604 A1 * | 8/2015 | Ylonen | G06F 21/575 |
| | | | 713/171 |
| 2015/0222621 A1 * | 8/2015 | Baum | H04L 63/0807 |
| | | | 726/9 |
| 2015/0248476 A1 * | 9/2015 | Weissinger | H04L 65/60 |
| | | | 707/737 |
| 2015/0341216 A1 * | 11/2015 | Cooppan | H04L 41/0809 |
| | | | 709/221 |
| 2015/0358345 A1 * | 12/2015 | Clark | G06F 21/556 |
| | | | 726/25 |
| 2016/0054939 A1 * | 2/2016 | Wang, III | G06F 11/1076 |
| | | | 711/154 |
| 2017/0054562 A1 * | 2/2017 | Cooper | G06F 16/2255 |
| 2017/0279496 A1 * | 9/2017 | Schultz | H04L 12/4625 |
| 2018/0139612 A1 * | 5/2018 | Rhelimi | H04W 8/20 |
| 2018/0181426 A1 * | 6/2018 | Shi | H04L 67/10 |

FOREIGN PATENT DOCUMENTS

| | | |
|---|---|---|
| CN | 105224385 A | 1/2016 |
| CN | 105718794 A | 6/2016 |
| EP | 2961094 A1 | 12/2015 |
| WO | 2015084144 A1 | 6/2015 |

OTHER PUBLICATIONS

Will Arthur et al: "A Practical Guide to TPM 2.0", Jan. 1, 2015, pp. 119-135, XP055499412.
Extended European Search Report issued in European Application No. 16887596.1 dated Aug. 23, 2018, 8 pages.

* cited by examiner

ABILITY-BASED VIRTUAL MACHINE
SECURITY PROTECTION METHOD AND
SYSTEM

CROSS-REFERENCE TO RELATED APPLICATIONS

This application is a continuation of International Application No. PCT/CN2016/097818, filed on Sep. 1, 2016, which claims priority to Chinese Patent Application No. 201610057356.8, filed on Jan. 27, 2016, both of which are hereby incorporated by reference in their entireties.

TECHNICAL FIELD

The present application relates to the field of Internet technologies, and in particular, to a vTPM-based virtual machine security protection method and system.

BACKGROUND

In modern life, the Internet not only brings great convenience to users' life, but also stimulates a lot of deceptive and criminal behaviors. This, together with various objective vulnerabilities of the Internet, leads to a series of information security problems. As the Internet gradually penetrates into every aspect of politics, military affairs, economy, culture, and life, information security has become a major issue affecting national security, social stability, and economic development, and powerful measures need to be taken to ensure information security.

Virtual machine security protection is used as an example. Currently, a root key is created for a vTPM (virtual trusted platform module) in a virtual machine mainly by using a TPM in a physical host. The vTPM sets up a key protection system for the virtual machine by using the root key, to protect sensitive information of the virtual machine, store a virtual environment metric, provide remote attestation for the virtual machine, and the like. A process in which the vTPM protects security of the virtual machine is as follows:

The TPM creates an AIK (attestation identity key) for the physical host. After a privacy CA (certificate authority) signs the created AIK, the TPM sends the signed AIK and a quote command to any vTPM on the physical host. The vTPM creates an EK' for the virtual machine by using the signed AIK and the quote command, creates an AIK' for the virtual machine based on the EK', and further, protects security of the virtual machine based on the created EK' and AIK'.

In the foregoing process, the protection of the security of the virtual machine by the vTPM mainly relies on the AIK created by the TPM. When the virtual machine is migrated from one physical host to another physical host, the key protection system set up by the vTPM for the virtual machine is no longer applicable. In this case, a new key protection system needs to be set up for the virtual machine on the new physical host, and this process not only requires complex operations and high resource consumption, but also breaks a key hierarchy in the virtual machine.

SUMMARY

To resolve a problem in a related technology, embodiments of the present application provide a vTPM-based virtual machine security protection method and system.

According to a first aspect, an embodiment of the present application provides a vTPM-based virtual machine security protection method. The method includes: When a virtual machine runs on a virtual platform for the first time, the virtual machine sends a primary seed acquisition request to a physical host, and the primary seed acquisition request carries information such as a UUID (universally unique identifier). The physical host receives the primary seed acquisition request sent by the virtual machine, and sends the UUID carried in the primary seed acquisition request to a KMC (key management center). The KMC generates a primary seed based on the UUID, and sends the generated primary seed to the virtual machine. When receiving the primary seed sent by the KMC, the virtual machine creates a root key for a vTPM according to the primary seed, and further sets up a key protection system. The primary seed does not depend on the physical host, but is distributed by the KMC. Therefore, when the virtual machine is migrated from one physical host to another physical host, the virtual machine may set up a key protection system for the vTPM again according to the primary seed, to protect data security of the virtual machine.

In a possible design, the physical host may send, according to a preconfigured KMC address, a key protection request specifically to the KMC specified by the KMC address. When receiving the key protection request sent by the physical host, the KMC randomly obtains a pair of asymmetric keys from a key database, stores a private key in the asymmetric keys, and sends a public key in the asymmetric keys to the physical host. The physical host receives the public key sent by the KMC, encrypts the UUID and other information (for example, a creator and a physical address) by using the public key, and sends the encrypted UUID and other information to the KMC. The physical host encrypts, by using the public key, the UUID and the other information that are to be sent to the KMC. This prevents the UUID and the other information from being intercepted by another user in a process of sending to the KMC, and improves information security of the virtual machine.

In a possible design, a first TPM is disposed in the physical host, and the first TPM is configured to store keys of different hierarchies in the physical host. In interaction between the physical host and the KMC, the physical host may invoke, from the first TPM, the public key sent by the KMC, encrypt data that is to be sent to the KMC, and decrypt data sent by the KMC, so as to ensure data security for the interaction with the KMC.

In a possible design, the KMC encrypts the generated primary seed by using the stored private key, and sends the encrypted primary seed to the physical host. When receiving the primary seed that is encrypted by the KMC by using the private key, the physical host invokes the public key from the first TPM, and decrypts the encrypted primary seed by using the public key to obtain the primary seed. By encrypting the primary seed, security of the primary seed is effectively ensured.

In a possible design, a second TPM is disposed in the KMC. When receiving the UUID sent by the physical host, the KMC generates a pair of symmetric keys, invokes a random number generation function from an OpenSSL library, uses the UUID and the symmetric keys as parameters for the random number generation function, and generates the primary seed.

In a possible design, the KMC stores the generated primary seed and the UUID in a database (for example, in a backup database). In a use process, even if the first TPM or a mainboard of a physical platform is damaged, the virtual machine can still obtain the primary seed from the KMC, and further recover the same root key according to the primary seed and set up a same key system, thereby effectively preventing a loss of data in the virtual machine.

According to a second aspect, an embodiment of the present application provides a vTPM-based virtual machine security protection system. The system includes: a virtual machine, a physical host, and a KMC. A first TSS and a first TPM are disposed in the physical host, and the first TSS can provide an interface for an external device (for example, a virtual machine or a KMC) to access a TPM. Multiple applications are installed in the virtual machine, and can trigger the virtual machine to perform different operations. A second TSS, a vTPM, and the like are disposed in the virtual machine, and the second TSS can provide an interface for an external device to access the vTPM. Multiple databases such as a backup database and a key database are disposed in the KMC.

When running on a virtual platform for the first time, the virtual machine sends a primary seed acquisition request to the physical host, and the primary seed acquisition request carries information such as a UUID. The physical host receives the primary seed acquisition request sent by the virtual machine, and sends the UUID carried in the primary seed acquisition request to the KMC. The KMC generates a primary seed based on the UUID, and sends the generated primary seed to the virtual machine. When receiving the primary seed sent by the KMC, the virtual machine creates a root key for the vTPM according to the primary seed, and further sets up a key protection system. The primary seed does not depend on the physical host, but is distributed by the KMC. Therefore, when the virtual machine is migrated from one physical host to another physical host, the virtual machine may set up a key protection system for the vTPM again according to the primary seed, to protect data security of the virtual machine.

In a possible design, the physical host may send, according to a preconfigured KMC address, a key protection request specifically to the KMC specified by the KMC address. When receiving the key protection request sent by the physical host, the KMC randomly obtains a pair of asymmetric keys from the key database, stores a private key in the asymmetric keys, and sends a public key in the asymmetric keys to the physical host. The physical host receives the public key sent by the KMC, encrypts the UUID and other information (for example, a creator and a physical address) by using the public key, and sends the encrypted UUID and other information to the KMC. The physical host encrypts, by using the public key, the UUID and the other information that are to be sent to the KMC. This prevents the UUID and the other information from being intercepted by another user in a process of sending to the KMC, and improves information security of the virtual machine.

In a possible design, a first TPM is disposed in the physical host, and the first TPM is configured to store keys of different hierarchies in the physical host. In interaction between the physical host and the KMC, the physical host may invoke, from the first TPM, the public key sent by the KMC, encrypt data that is to be sent to the KMC, and decrypt data sent by the KMC, so as to ensure data security for the interaction with the KMC.

In a possible design, the KMC encrypts the generated primary seed by using the stored private key, and sends the encrypted primary seed to the physical host. When receiving the primary seed that is encrypted by the KMC by using the private key, the physical host invokes the public key from the first TPM, and decrypts the encrypted primary seed by using the public key to obtain the primary seed. By encrypting the primary seed, security of the primary seed is effectively ensured.

In a possible design, a second TPM is disposed in the KMC. When receiving the UUID sent by the physical host, the KMC generates a pair of symmetric keys, invokes a random number generation function from an OpenSSL library, uses the UUID and the symmetric keys as parameters for the random number generation function, and generates the primary seed.

In a possible design, the KMC stores the generated primary seed and the UUID in a database (for example, in a key backup database). In a use process, even if the first TPM or a mainboard of a physical platform is damaged, the virtual machine can still obtain the primary seed from the KMC, and further recover the same root key according to the primary seed and set up a same key system, thereby effectively preventing a loss of data in the virtual machine.

According to a third aspect, an embodiment of the present application provides a computing device. The computing device includes a memory, a processor, and a bus, and the memory and the processor are directly connected by using the bus.

The memory is configured to store a computer instruction, the processor is configured to execute the computer instruction stored in the memory, and when the computer device runs, the processor runs the computer instruction, so that the computer device executes the vTPM-based virtual machine security protection method according to the first aspect.

The technical solutions provided in the embodiments of the present application bring the following beneficial effects:

The physical host receives the primary seed acquisition request that carries at least the UUID and that is sent by the virtual machine, and sends the UUID to the KMC. The KMC generates the primary seed according to the UUID. When receiving the primary seed fed back by the KMC, the physical host sends the primary seed to the virtual machine. The virtual machine creates the root key of the vTPM according to the primary seed, and the vTPM creates a key for the virtual machine by using the root key, to protect security of the virtual machine. The present application does not depend on any physical host. The primary seed is distributed to the virtual machine by using a third-party device. Therefore, when the virtual machine is migrated from one physical host to another physical host, the same root key can be created by using the primary seed. This reduces operation complexity and saves resources, without breaking a key hierarchy in the virtual machine.

BRIEF DESCRIPTION OF DRAWINGS

To describe the technical solutions in the embodiments of the present application more clearly, the following briefly describes the accompanying drawings required for describing the embodiments.

DESCRIPTION OF EMBODIMENTS

To make the objectives, technical solutions, and advantages of the present application clearer, the following further describes the embodiments of the present application in detail with reference to the accompanying drawings.

Figure 1:
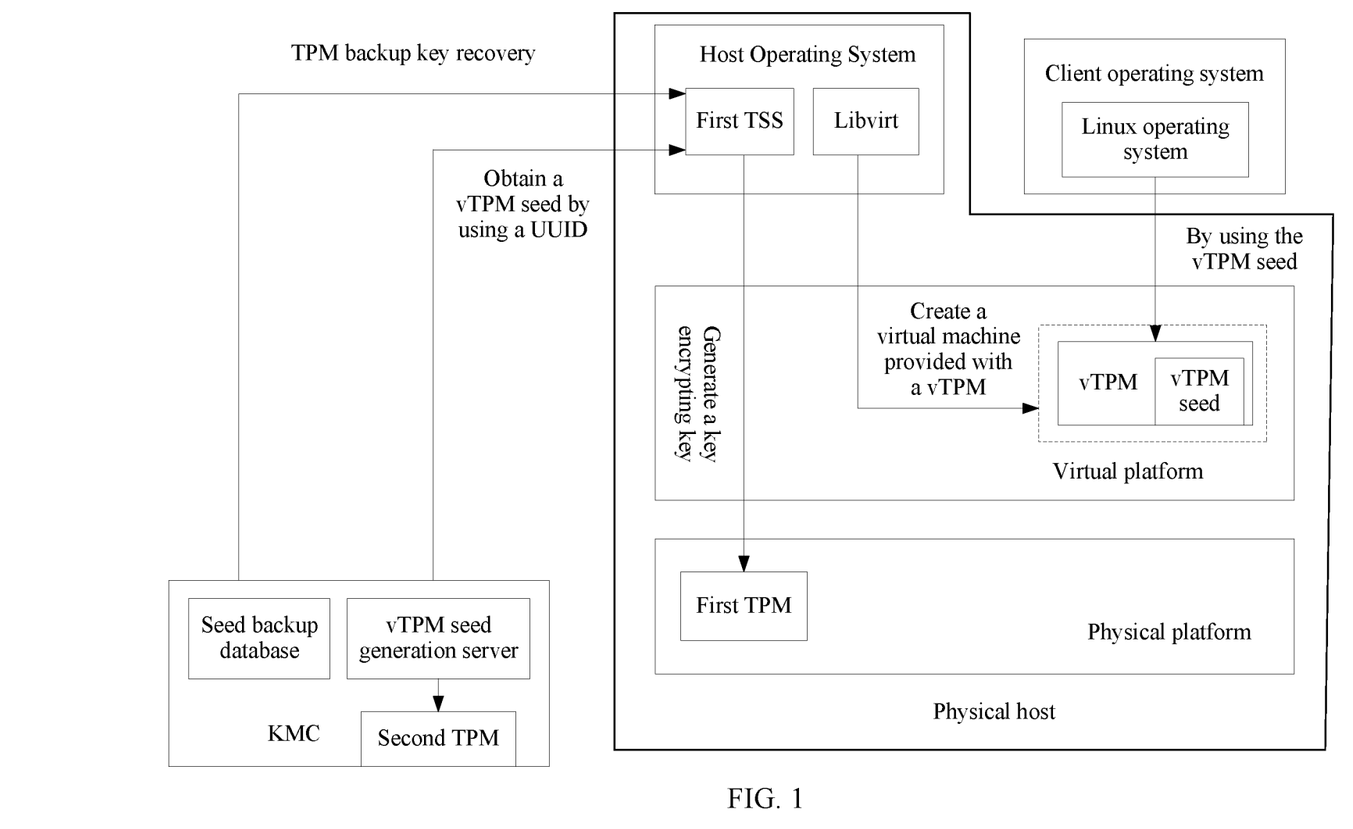
FIG. 1 is a schematic diagram of an implementation environment for a vTPM-based virtual machine security protection method according to an embodiment of the present application.

FIG. 1 is a schematic diagram of an implementation environment for a vTPM-based virtual machine security protection method according to the present application. Referring to FIG. 1, the implementation environment includes a physical host, a virtual machine, and a KMC.

The physical host includes a physical platform, a virtual platform, a Host Operating System, and various function components including a CPU, a hard disk, and the like. The physical platform is a platform on which the host is located. The physical platform stores a first TPM of the physical host, and the first TPM has functions such as protecting the physical host and preventing access of an unauthorized user. The Host Operating System is an operating system that is run by the physical host, and includes a first TSS (TPM software stack) and Libvirt. The first TSS is an interface over which an external device on the physical platform accesses the first TPM, and may obtain a key encrypting key from the first TPM of the physical platform. Libvirt is a Linux API (application programming interface) implementing a Linux virtualization function. The virtual platform stores a vTPM, and the vTPM may obtain the key encrypting key of the first TPM by using the first TSS, for example, obtain an AIK, an SIK, and the like that are created by the TPM for the physical host. The Host Operating System creates, on the virtual platform by using Libvirt, a virtual machine that has a vTPM configured therein. The virtual machine includes a client operating system and various function components such as a virtual CPU and a hard disk. The client operating system is an operating system that is run by a virtual machine managed by the virtual platform, and the client operating system may be a Linux operating system.

The KMC has functions such as a backup function and primary seed generation, and includes a seed backup database, a seed generation server, a second TPM, and the like. The first TSS may trigger, by sending a primary seed generation request to the seed generation server in the KMC, the seed generation server to generate a primary seed.

In an embodiment, the virtual platform runs on the physical platform, and the Host Operating System and the client operating system run on the virtual platform.

In another embodiment, the Host Operating System runs on the physical platform, the virtual platform is integrated in the Host Operating System, and the client operating system runs on the virtual platform.

The foregoing physical host, the KMC, and the virtual machine may communicate with each other by using a wired or wireless network.

Figure 2:
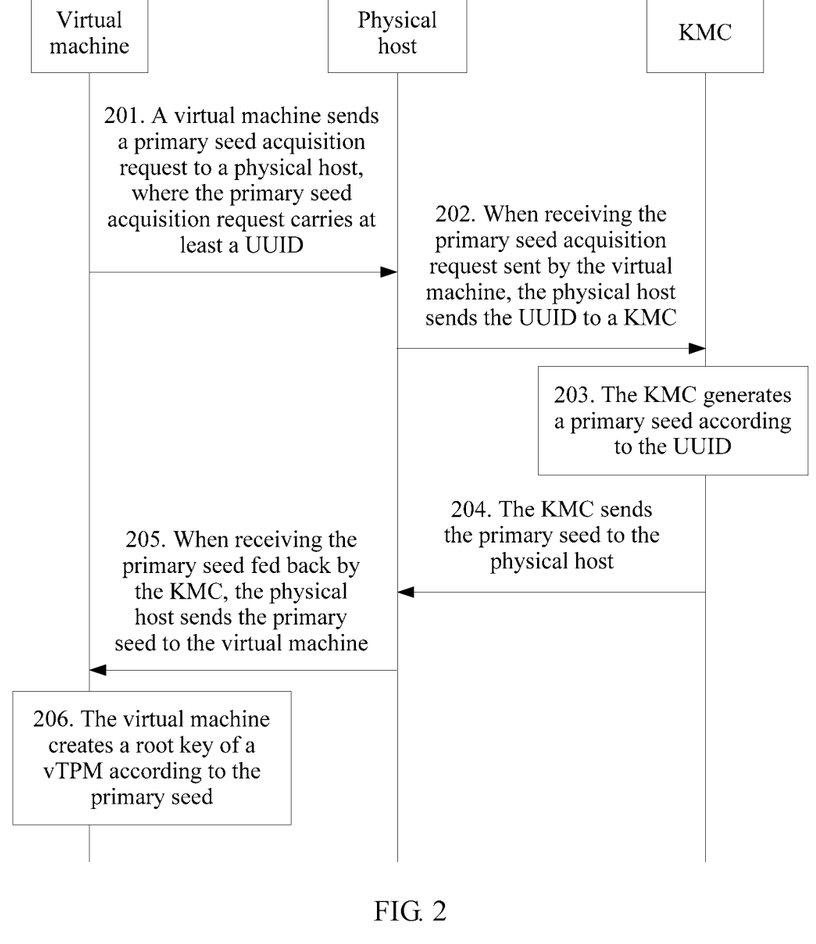
FIG. 2 is a flowchart of a vTPM-based virtual machine security protection method according to another embodiment of the present application.

Based on the implementation environment for the vTPM-based virtual machine security protection method shown in FIG. 1, an embodiment of the present application provides a vTPM-based virtual machine security protection method. Referring to FIG. 2, a procedure of the method provided in this embodiment includes the following steps.

201. A virtual machine sends a primary seed acquisition request to a physical host, where the primary seed acquisition request carries at least a UUID.

When the virtual machine runs on a virtual platform for the first time, a vTPM has not set up a key protection system for the virtual machine. To protect security of information stored in the virtual machine, the virtual machine may invoke an API to send the primary seed acquisition request to a first TSS of the physical host, so as to send the UUID to a KMC by using the physical host, and set up the key protection system for the virtual machine according to a primary seed distributed by the KMC. The primary seed acquisition request carries at least the UUID of the virtual machine, and the like.

202. When receiving the primary seed acquisition request sent by the virtual machine, the physical host sends the UUID to the KMC.

When the first TSS on the physical host receives the primary seed acquisition request sent by the virtual machine, the first TSS on the physical host sends a key protection request to the KMC based on a preconfigured KMC address. When receiving the key protection request, the KMC generates a pair of asymmetric keys according to a second TPM, and the asymmetric keys include a public key and a private key. The KMC stores the private key in the asymmetric keys, and sends the public key in the asymmetric keys to the first TSS on the physical host. In a process of interaction between the physical host and the KMC, the physical host encrypts, by using the public key fed back by the KMC, data that is to be sent to the KMC, and decrypts data sent by the KMC. The KMC encrypts, by using the private key, data that is to be sent to the physical host, and decrypts data sent by the physical host. In this embodiment, the data sent by the physical host to the KMC includes the UUID and other information such as an address of the physical host and a creator.

After the first TSS receives the public key sent by the KMC, the physical host stores the public key in a first TPM, and the first TPM of the physical host is responsible for storing encrypted information of the physical host.

Before the UUID is sent to the KMC, the first TSS on the physical host further loads the public key onto the corresponding first TPM, so that in a subsequent process of interaction with the KMC, the data such as the UUID that is to be sent to the KMC may be encrypted by using the public key in the first TPM. Specifically, the first TSS may invoke a TPM Load command during loading to load the public key in the asymmetric keys. If the public key is not successfully loaded, the procedure for setting up the key protection system by the vTPM for the virtual machine ends. If the public key is successfully loaded, the first TSS may encrypt the UUID and other information by invoking a TPM2_RSA_Encrypt command, to obtain first encrypted information, and further send the first encrypted information to the KMC over the Internet.

203. The KMC generates a primary seed according to the UUID.

When receiving a primary seed distribution request (including the first encrypted information), the KMC decrypts, according to the locally stored private key, ciphertext in the primary seed distribution request to obtain the first encrypted information, including the UUID and other information. The KMC generates a pair of symmetric keys by using the second TPM. Afterwards, the KMC invokes a random number generation function from an OpenSSL library, uses the UUID and the symmetric keys as parameters for the random number generator, and generates the primary seed based on the parameters.

After the primary seed is generated, when the KMC backs up the primary seed and the UUID to prevent damage to the first TPM or a mainboard on the physical host, the virtual machine may obtain, from the KMC, the primary seed by means of a request again, to recover a same root key according to the primary seed and set up a same key protection system.

204. The KMC sends the primary seed to the physical host.

The KMC encrypts the primary seed and other information by using the private key in the asymmetric keys, to obtain second encrypted information, and sends the second encrypted information to the physical host over the Internet.

205. When receiving the primary seed fed back by the KMC, the physical host sends the primary seed to the virtual machine.

When receiving the second encrypted information sent by the KMC, the first TSS obtains the public key in the asymmetric keys from the first TPM by invoking a TPM2_RSA_Decrypt command, decrypts the second encrypted information by using the public key, to obtain the primary seed and the other information, and further, sends the primary seed to the virtual machine.

So far, distribution of the primary seed is completed by means of the foregoing steps 201 to 205. In this process, the KMC distributes the primary seed to the corresponding virtual machine according to the UUID of the virtual machine. Even if the virtual machine is migrated to a new physical host, the primary seed obtained by the virtual machine from the KMC does not change because the UUID of the virtual machine does not change. Therefore, re-creation of a primary seed is avoided. In addition, both a process in which the virtual machine requests for primary seed distribution and a process in which the KMC distributes the primary seed are encrypted by the first TPM on the physical host. Therefore, a binding relationship between the vTPM and the first TPM is indirectly implemented, and security of the vTPM is effectively protected.

Figure 3A:
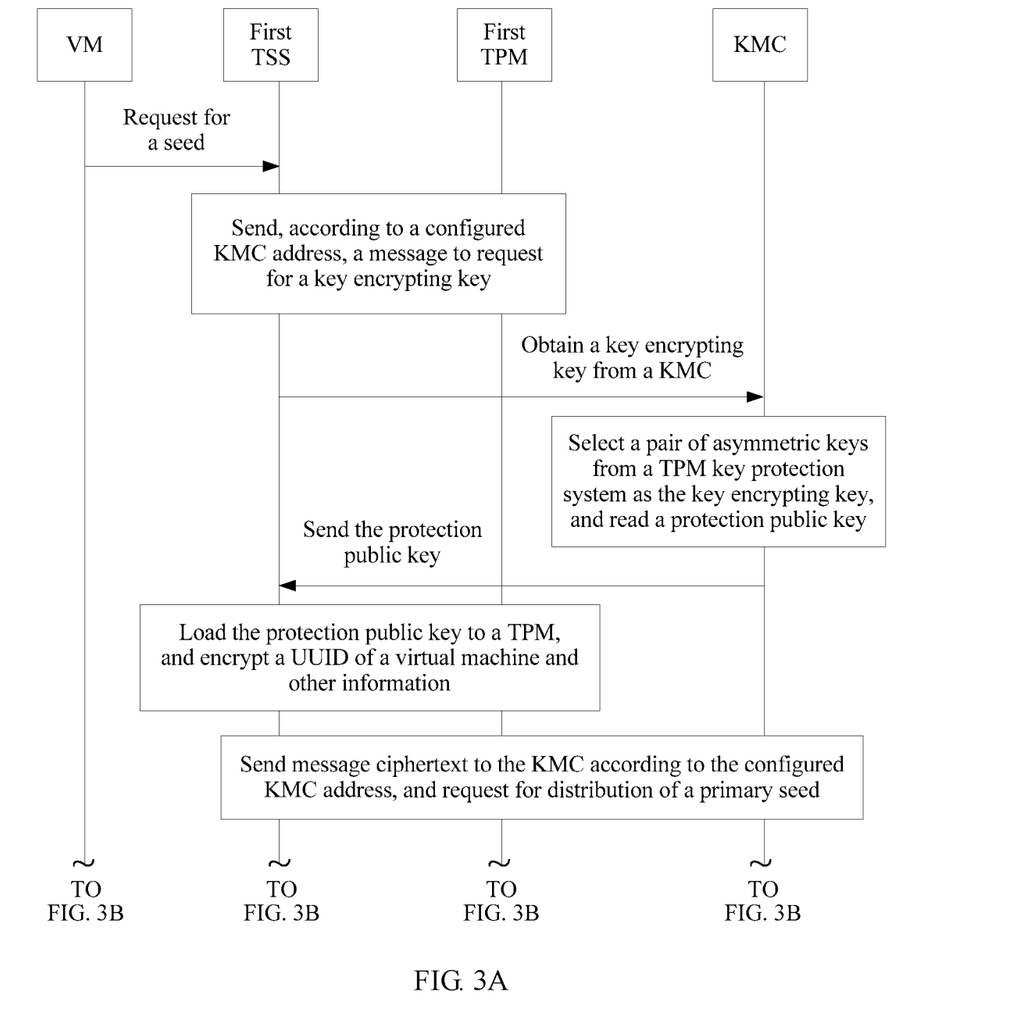
FIG. 3A and FIG. 3B are a flowchart of primary seed distribution according to another embodiment of the present application.
Figure 3B:
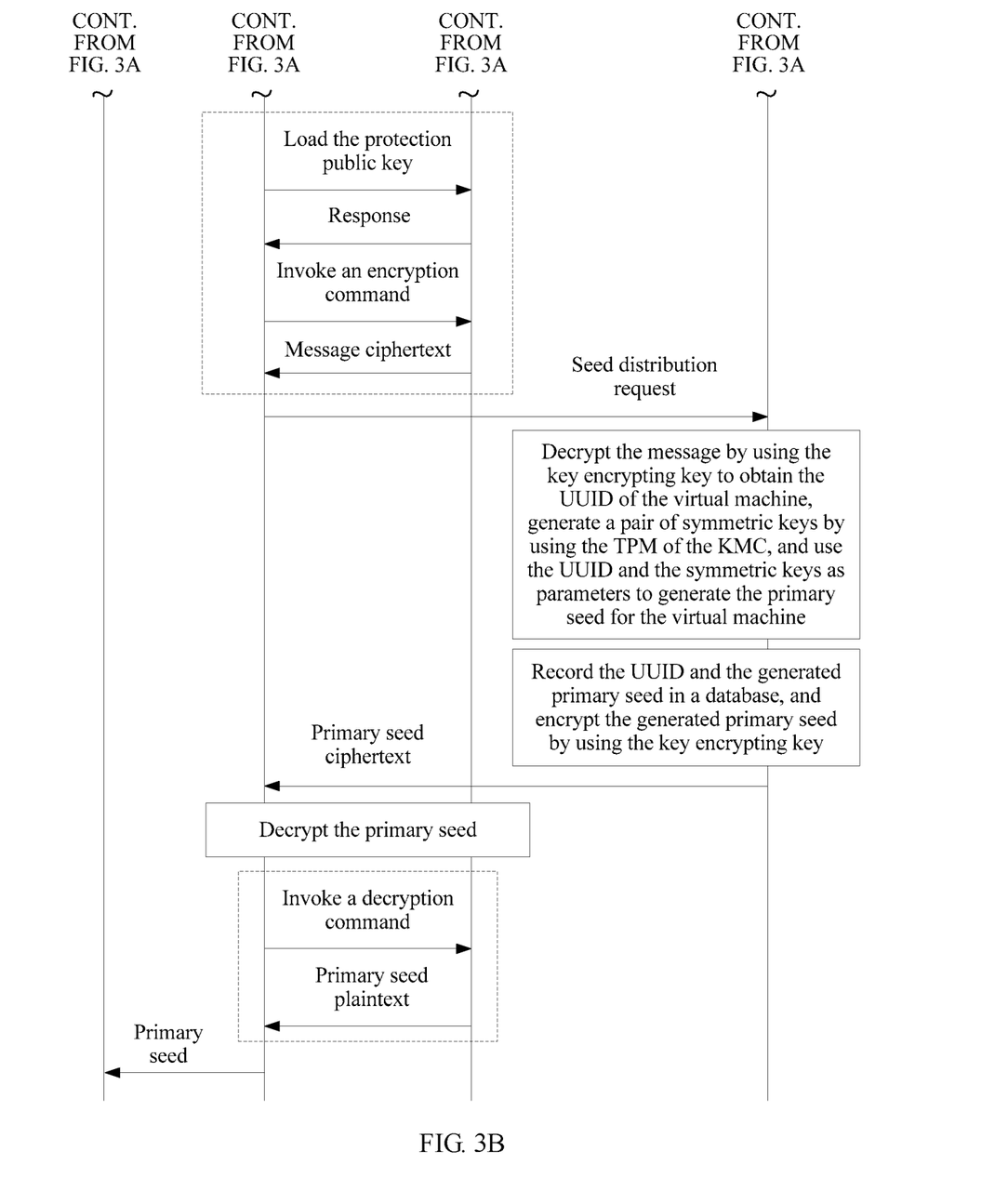

For the foregoing distribution process of the primary seed, for ease of understanding, the following uses FIG. 3A and FIG. 3B as an example for description.

Referring to FIG. 3A and FIG. 3B, after the virtual machine is started on a virtual platform for the first time, the virtual machine invokes an API to send the primary seed acquisition request to a physical host, and the primary seed acquisition request carries at least the UUID of the virtual machine. When receiving the primary seed acquisition request, the first TSS of the physical host sends a key protection request to the KMC according to the configured KMC address. After receiving the key protection request, the KMC generates a pair of asymmetric keys according to a second TPM. The KMC stores a private key in the asymmetric keys, and sends a public key in the asymmetric keys to the first TSS of the physical host. The first TSS of the physical host loads the public key in the asymmetric keys. If the public key is successfully loaded, the first TSS encrypts, by using the public key, the UUID and other information by invoking a TPM2_RSA_Encrypt command, to obtain the first encrypted information, and further sends the first encrypted information to the KMC. When receiving the first encrypted information, the KMC decrypts, according to the locally stored private key, the first encrypted information to obtain the UUID. In addition, the KMC generates a pair of symmetric keys according to the second TPM, and uses the UUID and the symmetric keys as the parameters for a random number generator to generate a primary seed. The KMC backs up the primary seed and the UUID, encrypts the primary seed by using the private key, to obtain second encrypted information, and further sends the second encrypted information to the first TSS of the physical host. The first TSS decrypts the second encrypted information according to the public key read from a first TPM, to obtain the primary seed, and further sends the primary seed to the virtual machine.

206. The virtual machine creates a root key of a vTPM according to the primary seed.

When receiving the primary seed sent by the physical host, the virtual machine loads the primary seed to a second TSS on the virtual platform, so that the second TSS loads the primary seed to the vTPM, and further, the virtual machine creates the root key for the vTPM according to the primary seed. In this embodiment, the primary seed includes an endorsement primary seed, a storage primary seed, and a platform primary seed. The three types of primary seeds are relatively large random numbers generated by the vTPM, and are used for derivation of a primary object. For the three types of the primary seeds, the virtual machine also creates three types of root keys for vTPMs according to the primary seeds. For example, if a primary seed is an endorsement primary seed, the root key created by the virtual machine for the vTPM according to the endorsement primary seed is an endorsement key. If a primary seed is a storage primary seed, the root key created by the virtual machine for the vTPM according to the storage primary seed is a storage root key. The endorsement key is used to generate an endorsement key certificate, and the storage root key is used to generate various encryption algorithms.

In this embodiment, for a process in which the virtual machine creates the root key for the vTPM according to the primary seed, refer to the following steps 2061-2066.

2061. When a specified application in the virtual machine runs, the specified application specifies in advance attribute information for a root key that is to be created.

When specifying the attribute information for the root key that is to be created, the specified application may invoke an API in the second TSS to specify the attribute information for the root key that is to be created. The attribute information includes a specified algorithm type, a key parameter, a key description, and the like.

2062. The virtual machine determines whether a virtual endorsement key has been locally created for the vTPM. If a virtual endorsement key has been created for the vTPM, step 2063 is performed, or if no virtual endorsement key has been created for the vTPM, the virtual machine creates a virtual endorsement key for the vTPM according to an endorsement primary seed.

In this embodiment, the virtual endorsement key is used to encrypt data sent by an owner, and the owner is a possessor of the virtual machine. When the virtual machine creates the virtual endorsement key according to the endorsement primary seed, the second TSS obtains the endorsement primary seed from the vTPM by invoking a TPM2_CreatePrimary command, and creates the virtual endorsement key for the vTPM based on the endorsement primary seed. In this process, if the second TSS receives a handle returned by the vTPM, it indicates that the virtual endorsement key is successfully created, the second TSS persists the virtual endorsement key to the vTPM, and the virtual machine performs step 2063. If the second TSS does not receive a handle returned by the vTPM, it indicates that a virtual endorsement key is not successfully created, and the procedure ends.

2063. The virtual machine determines whether an owner has been created for the vTPM. If an owner has been created for the vTPM, the virtual machine performs step 2064, or if no owner has been created for the vTPM, the virtual machine creates an owner for the vTPM according to a storage primary seed.

When determining that no owner has been created for the vTPM, the virtual machine creates a specified session according to the primary seed, and the specified session is a session from the second TSS to the vTPM. The virtual machine creates the owner for the vTPM by modifying authorization data (Auth value) of a storage control domain (Storage Hierarchy) of the specified session. In this process, the virtual machine further sets an owner right for the owner, to stipulate that the owner may control vTPM resource allocation. For example, the owner may control enabling and disabling of the storage control domain, create a root key, persist a key object to a non-volatile storage medium of the TPM, and so on. However, the owner cannot directly access a key. Therefore, an owner password needs to be managed by the second TSS, and the owner password may be a random value or a specified value. If the owner password is a random value, the random value is generated and stored by the second TSS. If the owner password is a specified value, the specified value may be a fixed value in code of the second TSS, and the like.

2064. The virtual machine creates a storage root key according to owner authorization data and a pre-specified key parameter.

The second TSS creates, in the vTPM by using the owner authorization data and the key parameter that is pre-specified by the specified application, the storage root key for the vTPM by invoking the TPM2_CreatePrimary command. In a process of creating the storage root key, if the second TSS receives a storage root key handle, it indicates that the storage root key has been successfully created in the vTPM. Certainly, in addition to receiving the storage root key handle, the second TSS further receives a storage key BLOB, and the like.

2065. After the storage root key has been successfully created, a TSS on a virtual platform persists the storage root key to a non-volatile storage medium of the vTPM.

When the storage root key has been successfully created, the second TSS sends a TPM2_EvictControl command to the vTPM. The vTPM persists the storage root key to the non-volatile storage medium by executing the TPM2_EvictControl command. After the storage root key is persisted to the non-volatile storage medium, when a client operating system is restarted, the virtual machine does not need to re-load the storage root key, and the storage root key is not replaced out of a memory of the virtual machine with another object.

2066. The virtual machine generates a key index of the storage root key and returns the key index to the specified application.

The second TSS saves the storage root key handle and the storage key BLOB, for example, saves the storage root key handle and the storage key BLOB to the non-volatile storage medium. In addition, the second TSS further generates the storage root key index according to the storage root key and sends the storage root key index to the specified application.

Figure 4:
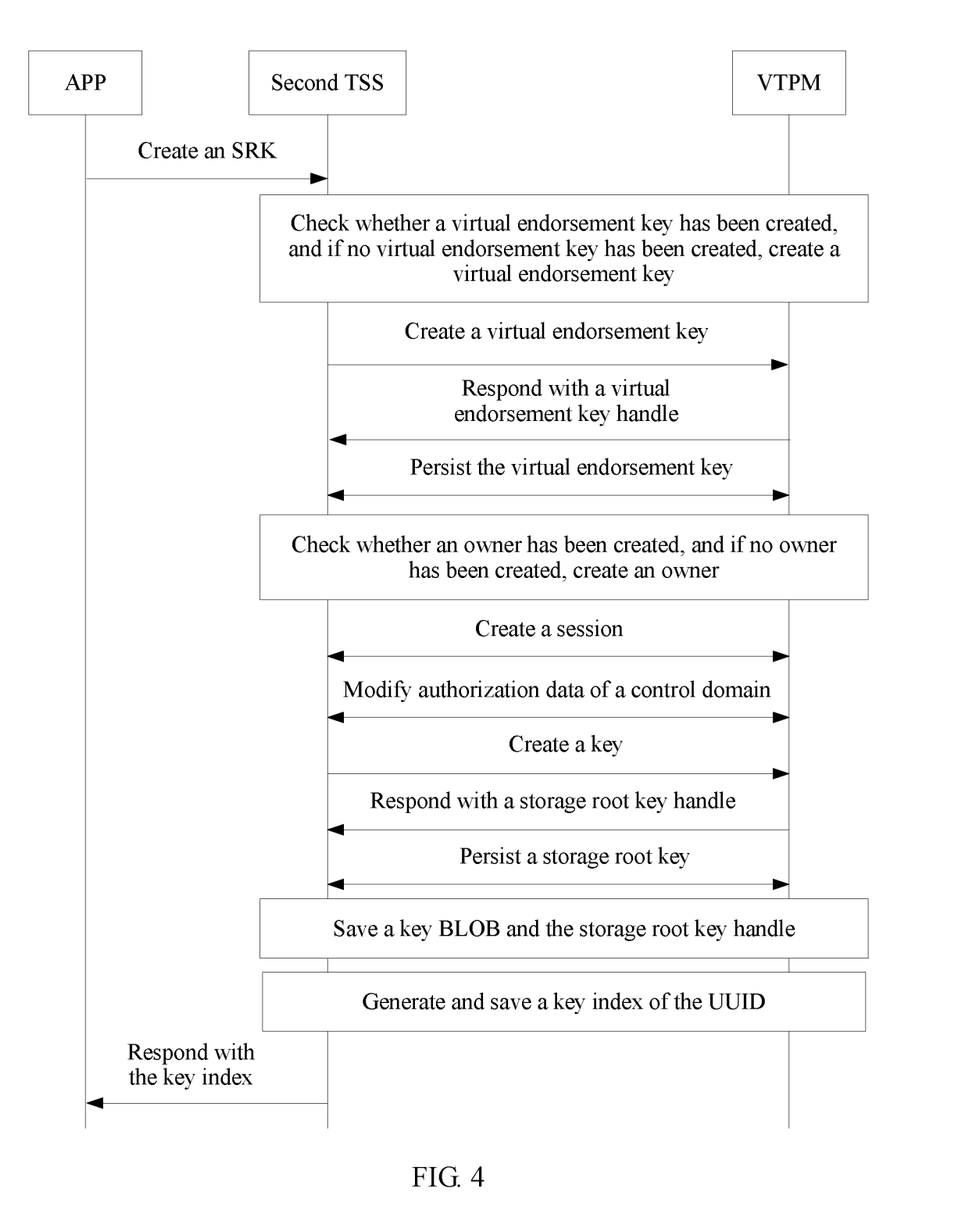
FIG. 4 is a flowchart of root key creation according to another embodiment of the present application.

For a process in which the virtual machine creates the root key for the vTPM according to the primary seed, the following uses FIG. 4 as an example for detailed description.

(1). A specified application in the virtual machine invokes an API in the second TSS to specify attribute information for a root key that is to be created.

(2). The virtual machine determines whether a virtual endorsement key has been locally created for the vTPM. If no virtual endorsement key has been created for the vTPM, the second TSS obtains an endorsement primary seed from the vTPM by invoking a TPM2_CreatePrimary command, and creates a virtual endorsement key for the vTPM based on the endorsement primary seed. In this process, if the second TSS receives a handle returned by the vTPM, it indicates that the virtual endorsement key is successfully created.

(3). The virtual machine determines whether an owner has been created for the vTPM. If no owner has been created for the vTPM, the virtual machine creates a specified session according to a storage primary seed, and the specified session is a session from the second TSS to the vTPM. The virtual machine creates an owner for the vTPM by modifying authorization data (Auth value) of a storage control domain (Storage Hierarchy) of the specified session.

(4). The second TSS creates, in the vTPM by using the owner authorization data and the key parameter that is pre-specified by the specified application, a storage root key for the vTPM by invoking the TPM2_CreatePrimary command. In a process of creating a storage root key, if the second TSS receives a storage root key handle, it indicates that the storage root key has been successfully created in the vTPM. Certainly, in addition to receiving the storage root key handle, the second TSS further receives a storage key BLOB, and the like.

(5). The second TSS sends a TPM2_EvictControl command to the vTPM, and the vTPM persists the storage root key to the non-volatile storage medium by executing the TPM2_EvictControl command.

(6). The second TSS saves the storage root key handle and the storage key BLOB, in addition, generates a storage root key index according to the storage root key, and sends the storage root key index to the specified application.

According to the method provided in this embodiment of the present application, the physical host receives the primary seed acquisition request that carries at least the UUID and that is sent by the virtual machine, and sends the UUID to the KMC. The KMC generates the primary seed according to the UUID. When receiving the primary seed fed back by the KMC, the physical host sends the primary seed to the virtual machine. The virtual machine creates the root key of the vTPM according to the primary seed, and the vTPM creates the key for the virtual machine by using the root key, to protect security of the virtual machine. The present application does not depend on any physical host. The primary seed is distributed to the virtual machine by using a third-party device. Therefore, when the virtual machine is migrated from one physical host to another physical host, the same root key can be created by using the primary seed. This reduces operation complexity and saves resources, without breaking a key hierarchy in the virtual machine.

Figure 5:
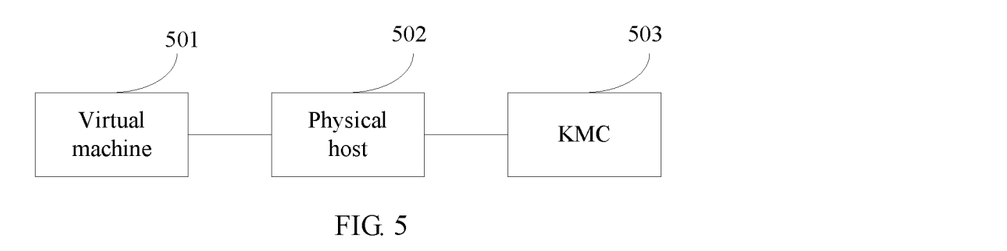
FIG. 5 is a schematic structural diagram of a vTPM-based virtual machine security protection system according to another embodiment of the present application.

Referring to FIG. 5, an embodiment of the present application provides a vTPM-based virtual machine security protection system, and the system includes a virtual machine 501, a physical host 502, and a key management center KMC 503.

The physical host 502 is configured to receive a primary seed acquisition request sent by the virtual machine 501, where the primary seed acquisition request carries at least a universally unique identifier UUID.

The physical host 502 is further configured to send the UUID to the KMC 503.

The KMC 503 is configured to: generate a primary seed according to the UUID, and send the primary seed to the physical host 502.

The physical host 502 is further configured to: receive the primary seed fed back by the KMC 503, and send the primary seed to the virtual machine 501.

The virtual machine 501 is configured to create a root key of a virtual trusted platform module vTPM according to the primary seed, where the root key is used by the vTPM to create a key for the virtual machine, to protect security of the virtual machine.

In another embodiment of the present application, the physical host 502 is further configured to send, based on a preconfigured KMC address, a key protection request to the KMC 503 specified by the KMC address.

The KMC 503 is further configured to obtain asymmetric keys when receiving the key protection request, where the asymmetric keys include a public key and a private key.

The KMC 503 is further configured to: store the private key and send the public key to the physical host 502.

The physical host 502 is further configured to: receive the public key fed back by the KMC 503, and encrypt, by using the public key, the UUID that is to be sent to the KMC.

The KMC 503 is further configured to obtain the UUID by means of decryption by using the private key.

In another embodiment of the present application, the physical host 502 is further configured to load the public key onto a corresponding first trusted platform module TPM, so that the UUID that is to be sent to the KMC 503 is encrypted by using the public key in the first TPM.

In another embodiment of the present application, the KMC 503 is further configured to encrypt, by using the private key, the primary seed that is to be fed back to the physical host 502.

The physical host 502 is further configured to obtain, by means of decryption by using the public key, the primary seed fed back by the KMC 503.

In another embodiment of the present application, the KMC 503 is further configured to: generate symmetric keys according to a corresponding second TPM, and use the UUID and the symmetric keys as parameters for a random number generator, so that the random number generator generates the primary seed based on the parameters.

In another embodiment of the present application, the KMC 503 is further configured to back up the primary seed and the UUID, so that the virtual machine 501 obtains, from the KMC, the primary seed by means of a request again, and the virtual machine recovers a same root key based on the primary seed.

According to the system provided in this embodiment of the present application, the physical host receives the primary seed acquisition request that carries at least the UUID and that is sent by the virtual machine, and sends the UUID to the KMC. The KMC generates the primary seed according to the UUID. When receiving the primary seed fed back by the KMC, the physical host sends the primary seed to the virtual machine. The virtual machine creates the root key of the vTPM according to the primary seed, and the vTPM creates the key for the virtual machine by using the root key, to protect security of the virtual machine. The present application does not depend on any physical host. The primary seed is distributed to the virtual machine by using a third-party device. Therefore, when the virtual machine is migrated from one physical host to another physical host, the same root key can be created by using the primary seed. This reduces operation complexity and saves resources, without breaking a key hierarchy in the virtual machine.

Figure 6:
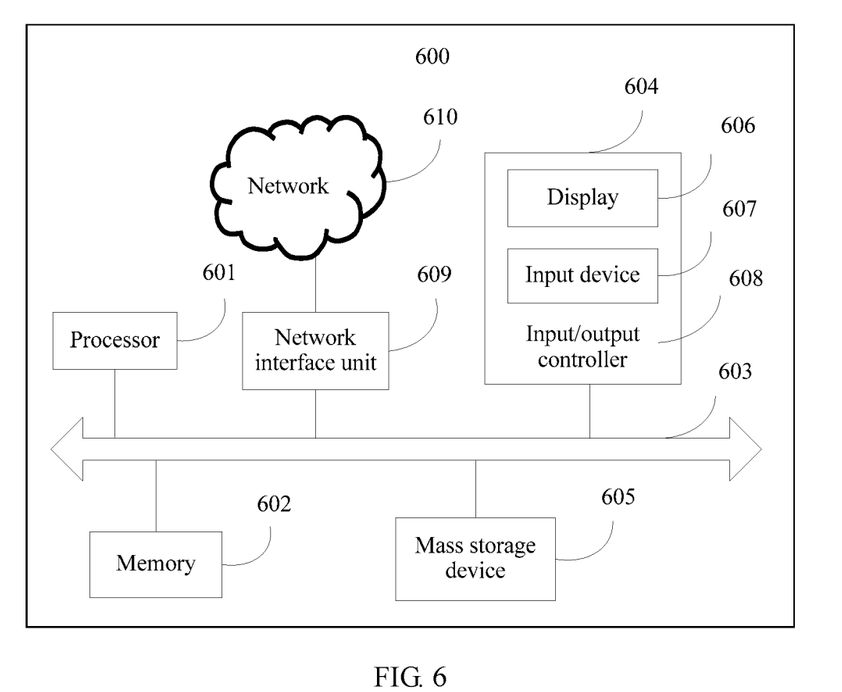
FIG. 6 is a schematic structural diagram of a computer device according to another embodiment of the present application.

Referring to FIG. 6, FIG. 6 shows an illustrative computer system structure of a computing device 600 used in an embodiment of the present application. The computing device 600 is a normal desktop computer or laptop computer, and one or more computing devices 600 may constitute a physical platform. The computing device 600 includes a processor 601, a memory 602, and a bus 603, and the processor 601 and the memory 602 are directly connected by using the bus 603. The computing device 600 further includes a basic input/output system (I/O system) 604 that helps components in the computing device transmit information and a mass storage device 605 that is configured to store an operating system, an application program, and another program module.

The basic input/output system 604 includes a display 606 that is configured to display information and an input device 607 that is configured to enable a user to enter information, such as a mouse or a keyboard. The display 606 and the input device 607 are connected to the processor 601 by using an input/output controller 608 that is connected to the bus 603. The basic input/output system 604 may further include the input/output controller 608 to receive and process inputs from multiple other devices such as a keyboard, a mouse, and an electronic stylus. Similarly, the input/output controller 608 further provides an output for a display screen, a printer, or another type of output device.

The mass storage device 605 is connected to the processor 601 by using a mass storage controller (not shown) connected to the bus 603. The mass storage device 605 and a computer readable medium associated with the mass storage device 605 provide non-volatile storage for the computing device 600. That is, the mass storage device 605 may include a computer readable medium (not shown) such as a hard disk or a CD-ROM drive.

Generally, the computer readable media may include a computer storage medium and a communication medium.

The computer storage medium includes a volatile, non-volatile, movable, or unmovable medium that is implemented by using any method or technology and that is configured to store information such as a computer readable instruction, a data structure, a program module, or other data. The computer storage medium includes a RAM, a ROM, an EPROM, an EEPROM, a flash memory, or another solid-state storage technology, a CD-ROM, a DVD, or another optical storage, a cassette, a magnetic tape, a disk storage, or another magnetic storage device. Certainly, a person skilled in the art may learn that the computer storage medium is not limited to the foregoing several types.

According to various embodiments of the present application, the computing device 600 may further connect to a remote computer on a network by using a network such as the Internet for running. That is, the computing device 600 may connect to a network 610 by using a network interface unit 609 that is connected to the bus 603, or the computing device 600 may connect to another type of network or a remote computer system (not shown) by using the network interface unit 609.

In conclusion, according to the computing device provided in this embodiment of the present application, the physical host receives the primary seed acquisition request that carries at least the UUID and that is sent by the virtual machine, and sends the UUID to the KMC. The KMC generates the primary seed according to the UUID. When receiving the primary seed fed back by the KMC, the physical host sends the primary seed to the virtual machine. The virtual machine creates the root key of the vTPM according to the primary seed, and the vTPM creates a key for the virtual machine by using the root key, to protect security of the virtual machine. The present application does not depend on any physical host. The primary seed is distributed to the virtual machine by using a third-party device. Therefore, when the virtual machine is migrated from one physical host to another physical host, the same root key can be created by using the primary seed. This reduces operation complexity and saves resources, without breaking a key hierarchy in the virtual machine.

It should be noted that, when the vTPM security protection system provided in the foregoing embodiment protects security of the vTPM, division of the foregoing functional modules is merely used as an example for description. In actual application, the foregoing functions may be allocated to different functional modules for implementation according to a requirement. That is, an internal structure of the vTPM security protection system is divided into different functional modules to implement all or part of the functions described above. In addition, the vTPM security protection system provided in the foregoing embodiment belongs to the same concept as the vTPM security protection method embodiments. For a specific implementation process, refer to the method embodiments, and details are not described herein again.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely examples of embodiments of the present application, but are not intended to limit the present application. Any modification, equivalent replacement, and improvement made without departing from the spirit and principle of the present application shall fall within the protection scope of the present application.

What is claimed is:

1. A virtual trusted platform module (vTPM)-based virtual machine security protection method, wherein the method comprises:
   receiving, by a physical host, a primary seed acquisition request sent by a virtual machine, wherein the primary seed acquisition request includes at least a universally unique identifier (UUID) of the virtual machine and requests acquisition of a primary seed from a key management center (KMC) that is external to the physical host, wherein the primary seed is used by the virtual machine to create a root key of a virtual trusted platform module (vTPM);
   sending, by the physical host, the UUID to the KMC, wherein a primary seed is generated by the KMC using the UUID; and
   receiving, by the physical host, the primary seed generated by the KMC; and
   sending the primary seed to the virtual machine, wherein the primary seed is used by the virtual machine to create the root key of the vTPM, and wherein the root key is used by the vTPM to create a key for the virtual machine to protect security of the virtual machine.

2. The method according to claim 1, wherein before the sending, by the physical host, the UUID to a KMC, the method further comprises:
   sending, by the physical host based on a preconfigured KMC address, a key protection request to the KMC specified by the KMC address, wherein the key protection request indicates the KMC to obtain asymmetric keys, the asymmetric keys comprise a public key and a private key, and the KMC stores the private key;
   receiving, by the physical host, the public key fed back by the KMC; and
   encrypting, by the physical host, the UUID using the public key, wherein the private key is used to decrypt out the UUID from the encrypted UUID.

3. The method according to claim 2, wherein the method further comprises:
   loading, by the physical host, the public key onto a corresponding first trusted platform module TPM, wherein the UUID is encrypted using the public key in the first TPM before being sent to the KMC.

4. The method according to claim 2, wherein the method further comprises:
   encrypting, by the KMC using the private key, the primary seed before feeding back to the physical host; and
   before the sending, by the physical host, the primary seed to the virtual machine, the method further comprises:
   obtaining, by the physical host by decryption using the public key, the primary seed fed back by the KMC.

5. The method according to claim 2, wherein the primary seed is generated according to the UUID by:
   generating a symmetric key according to a corresponding second TPM, and using the UUID and the symmetric key as parameters for a random number generator, wherein the primary seed is generated by the random number generator based on the parameters.

6. The method according to claim 1, wherein the method further comprises:
   backing up, by the KMC, the primary seed and the UUID, wherein the same primary seed is to be obtained from the KMC in response to that the virtual machine requests the primary seed again.

7. A vTPM-based virtual machine security protection system, wherein the system comprises:
   a virtual machine;
   a physical host; and
   a key management center (KMC), wherein:
   the physical host is configured to receive a primary seed acquisition request sent by the virtual machine, wherein the primary seed acquisition request include at least a universally unique identifier (UUID) of the virtual machine and requests acquisition of a primary seed from the KMC that is external to the physical host, wherein the primary seed is used by the virtual machine to create a root key of a virtual trusted platform module (vTPM);
   the physical host is further configured to send the UUID to the KMC;
   the KMC is configured to: generate a primary seed using the UUID, and send the primary seed to the physical host;
   the physical host is further configured to: receive the primary seed generated by the KMC, and send the primary seed to the virtual machine; and
   the virtual machine is configured to create the root key of the vTPM according to the primary seed, wherein the root key is used by the vTPM to create a key for the virtual machine, to protect security of the virtual machine.

8. The system according to claim 7, wherein the physical host is further configured to send, based on a preconfigured KMC address, a key protection request to the KMC specified by the KMC address;

the KMC is further configured to obtain asymmetric keys when receiving the key protection request, wherein the asymmetric keys comprise a public key and a private key;

the KMC is further configured to store the private key and send the public key to the physical host;

the physical host is further configured to: receive the public key fed back by the KMC, encrypt the UUID using the public key, and send the encrypted UUID to the KMC; and the KMC is further configured to receive the encrypted UUID, and decrypt out the UUID from the encrypted UUID using the private key.

9. The system according to claim 8, wherein the physical host is further configured to load the public key onto a corresponding first trusted platform module (TPM), wherein the UUID is encrypted using the public key in the first TPM before being sent to the KMC.

10. The system according to claim 8, wherein the KMC is further configured to encrypt the primary seed using the private key, and feedback the encrypted primary seed to the physical host; and the physical host is further configured to decrypt out the primary seed from the encrypted primary seed using the public key.

11. The system according to claim 8, wherein the KMC is further configured to generate a symmetric key according to a corresponding second TPM, and use the UUID and the symmetric key as parameters for a random number generator, wherein the primary seed is generated by the random number generator based on the parameters.

12. The system according to claim 8, wherein the KMC is further configured to back up the primary seed and the UUID, wherein the same primary seed is to be obtained from the KMC when the virtual machine requests the primary seed again.

13. A computer device, comprising:
at least one processor; and
a non-transitory computer-readable storage medium coupled to the at least one processor and storing programming instructions for execution by the at least one processor, the programming instructions instruct the at least one processor to:
receive a primary seed acquisition request sent by a virtual machine, wherein the primary seed acquisition request carries at least a universally unique identifier (UUID) of the virtual machine and requests acquisition of a primary seed from a key management center (KMC) that is external to the physical host, wherein the primary seed is used by the virtual machine to create a root key of a virtual trusted platform module (vTPM);

send the UUID to the KMC, wherein a primary seed is generated by the KMC using the UUID;
receive the primary seed generated by the KMC; and
send the primary seed to the virtual machine, wherein the primary seed is used by the virtual machine to create the root key of the vTPM, and wherein the root key is used by the vTPM to create a key for the virtual machine to protect security of the virtual machine.

14. The computer device of claim 13, wherein, before the sending the UUID to the KMC, the programming instructions instruct the at least one processor to:
send, based on a preconfigured KMC address, a key protection request to the KMC specified by the KMC address, wherein the key protection request indicates the KMC to obtain asymmetric keys, the asymmetric keys comprise a public key and a private key, and the KMC stores the private key;
receive the public key fed back by the KMC; and
encrypt the UUID using the public key, wherein the private key is used to decrypt out the UUID from the encrypted UUID.

15. The computer device of claim 14, wherein the programming instructions instruct the at least one processor to:
load the public key onto a corresponding first trusted platform module (TPM), wherein the UUID is encrypted using the public key in the first TPM before being sent to the KMC.

16. The computer device of claim 14, wherein the KMC encrypts, using the private key, the primary seed before feeding back the private key, and wherein the programming instructions instruct the at least one processor to:
before the sending the primary seed to the virtual machine, obtaining, by decryption using the public key, the primary seed fed back by the KMC.

17. The computer device of claim 14, wherein the primary seed is generated according to the UUID by:
generating a symmetric key according to a corresponding second TPM, and using the UUID and the symmetric key as parameters for a random number generator, wherein the primary seed is generated by the random number generator based on the parameters.

18. The computer device of claim 13, wherein the KMC backs up the primary seed and the UUID, wherein programming instructions instruct the at least one processor to:
backing up, by the KMC, the primary seed and the UUID, wherein the same primary seed is to be obtained from the KMC in response to the virtual machine requests the primary seed again.

* * * * *